United States Patent
Lewis et al.

(10) Patent No.: US 7,516,736 B2
(45) Date of Patent: Apr. 14, 2009

(54) FUEL DISTRIBUTOR AND MOUNTING SYSTEM THEREFOR AND METHOD OF MOUNTING A FUEL DISTRIBUTOR

(75) Inventors: Steven A. Lewis, South Bend, IN (US); James F. Toth, Niles, MI (US); Gary A. Valencourt, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 424 days.

(21) Appl. No.: 11/432,523

(22) Filed: May 12, 2006

(65) Prior Publication Data

US 2006/0272330 A1   Dec. 7, 2006

Related U.S. Application Data

(60) Provisional application No. 60/681,441, filed on May 17, 2005.

(51) Int. Cl.
*F02M 55/02* (2006.01)
(52) U.S. Cl. .................. 123/469; 123/470; 123/445
(58) Field of Classification Search .............. 403/146; 411/265, 354, 418, 935; 52/549; 74/469; 123/470, 184.17, 41.31
See application file for complete search history.

(56) References Cited

U.S. PATENT DOCUMENTS

| 2,362,664 A | * | 11/1944 | Reed ............................ 403/146 |
| 2,833,356 A | | 5/1958 | Gardiner et al. |
| 2,978,209 A | | 4/1961 | Kerry |
| 4,421,089 A | | 12/1983 | Moore, Jr. |
| 4,664,084 A | | 5/1987 | Wheelock |
| 4,938,418 A | | 7/1990 | Halvorsen |
| 5,279,112 A | | 1/1994 | Halila |
| 5,353,767 A | * | 10/1994 | Carbone et al. ............. 123/470 |
| 5,544,404 A | | 8/1996 | Brunnhofer et al. |
| 5,845,622 A | | 12/1998 | van den Wildenberg |

(Continued)

FOREIGN PATENT DOCUMENTS

EP   0412067   2/1991

(Continued)

*Primary Examiner*—Stephen K Cronin
*Assistant Examiner*—Keith Coleman
(74) *Attorney, Agent, or Firm*—Ingrassia Fisher & Lorenz, P.C.

(57) ABSTRACT

A fuel distributor (10) and mounting arrangement that helps support the weight of the fuel distributor (10) during removal and replacement for improved maintainability. The mounting arrangement includes a hanger (60) mountable on a first support which hanger (60) includes a slot (70), and a manifold (40) separate from the hanger (60) that has a first side (43) with a plurality of ports (54) arranged in a first configuration. The manifold (40) is connectable to a plurality of fluid lines on an engine (80). A fuel distributor body (12) has a first surface, a second surface spaced from the first surface and a third surface between the first surface and the second surface with a hanging cleat (36) projecting from the first surface that is configured to be received within the slot (70). The third surface has a main fuel inlet (16) and a plurality of additional fluid ports (18) arranged in the same configuration as the ports on the manifold (40). A mounting pin (26) projects from the third surface. Also a method of mounting a fuel distributor.

16 Claims, 12 Drawing Sheets

U.S. PATENT DOCUMENTS

| | | | |
|---|---|---|---|
| 6,135,092 A * | 10/2000 | Schaenzer et al. | 123/456 |
| 6,405,711 B1 | 6/2002 | Smith et al. | |
| 6,631,705 B1 | 10/2003 | Rivera | |
| 2003/0168115 A1 | 9/2003 | Jansen | |
| 2003/0234002 A1 | 12/2003 | Rivera | |

FOREIGN PATENT DOCUMENTS

| | | |
|---|---|---|
| EP | 1277949 | 1/2003 |
| JP | 2003063490 | 3/2003 |

\* cited by examiner

FUEL DISTRIBUTOR AND MOUNTING SYSTEM THEREFOR AND METHOD OF MOUNTING A FUEL DISTRIBUTOR

CROSS-REFERENCE TO RELATED APPLICATIONS

The present invention claims the benefit of U.S. Provisional Patent Application No. 60/681,441, filed May 17, 2005, the entire contents of which are hereby incorporated by reference.

STATEMENT OF GOVERNMENT RIGHTS

This invention was made with government support under Contract No. N00019-02-C-3003 awarded by the United States Navy. The government has certain rights in this invention.

FIELD OF THE INVENTION

The present invention is directed to an improved system and method for mounting a fuel distributor on an engine, and, more specifically, toward an improved system and method for mounting a fuel distributor having fluid ports on an aircraft engine that involves attaching a manifold to the aircraft engine to which the fuel distributor can be connected.

BACKGROUND OF THE INVENTION

Aircraft engines often include a number of interconnected components that perform different functions. These components may require an electrical connection to a source of power on the engine or to another component that has or is connected to a power supply. In addition, many components are used for fluid handling and include various pipes or passageways for carrying fuel or other fluids to and from the engine. Each of these pipes and passageways generally must be connected to another pipe or passageway to allow the component to receive or discharge fluid.

When designing aircraft engine components, it is often necessary to strike a balance between weight and cost. One way of decreasing cost is to make a part easier to install and remove from an engine. Two methods are generally used for mounting components on an aircraft engine. In a first method, components are connected to openings on the engine by various pipes and tubes, each of which must generally be connected individually to the engine. Such components are relatively lightweight, but require significant time and skilled labor to mount and remove for installation, repair or replacement. Furthermore, when such a mounting arrangement is used, it is often necessary to use flexible pipes that can be bent away from a component to allow the component to be removed from its mounting location. If flexible pipe is not used, it may be necessary to provide additional connectors so that a segment of pipe near the component can be removed to make room for installing or removing the component.

A second mounting method uses a heavy manifold that includes all necessary fluid connections. The manifold can be connected to an engine so that openings on the manifold align with openings on the engine to allow multiple fluid connections to be made in one or a small number of steps. This allows for a modular approach to component design and produces components that are relatively easy to assemble. However, providing a manifold for each component can significantly increase the weight and cost of the system. It would therefore be desirable to provide a system and method for mounting aircraft engine components that reduces weight while providing benefits similar to those available from a manifold-type mounting system.

SUMMARY OF THE INVENTION

These and other problems are addressed by various embodiments of the present invention which comprises, in a first aspect, a method of connecting a fuel distributor having a main fuel inlet port, additional fluid ports and a hanging cleat to an engine. The method involves connecting a plurality of fluid lines on the engine to a manifold, providing a hanger on the engine, and, with the hanger and manifold connected to the engine, hanging the fuel distributor from the hanger by the cleat and connecting the manifold to the fuel distributor. A main fuel input line separate from the manifold is also connected to the fuel distributor.

Another aspect of the invention is a fuel distributor and mounting arrangement therefor that includes a hanger mountable on a first support which hanger includes a slot, and a manifold separate from the hanger that has a first side with a plurality of ports arranged in a first configuration. The manifold is connectable to a plurality of fluid lines on an engine. A fuel distributor body is provided that has a first surface, a second surface spaced from the first surface and a third surface between the first surface and the second surface with a hanging cleat projecting from the first surface that is configured to be received within the slot. The third surface has a main fuel inlet and a plurality of additional fluid ports arranged in the same first configuration as the ports on the manifold. A mounting pin projects from the third surface.

BRIEF DESCRIPTION OF THE DRAWINGS

These and other aspects and features of embodiments of the invention will be better understood after a reading of the following detailed description together with the accompanying drawings wherein.

DETAILED DESCRIPTION

Figure 1:
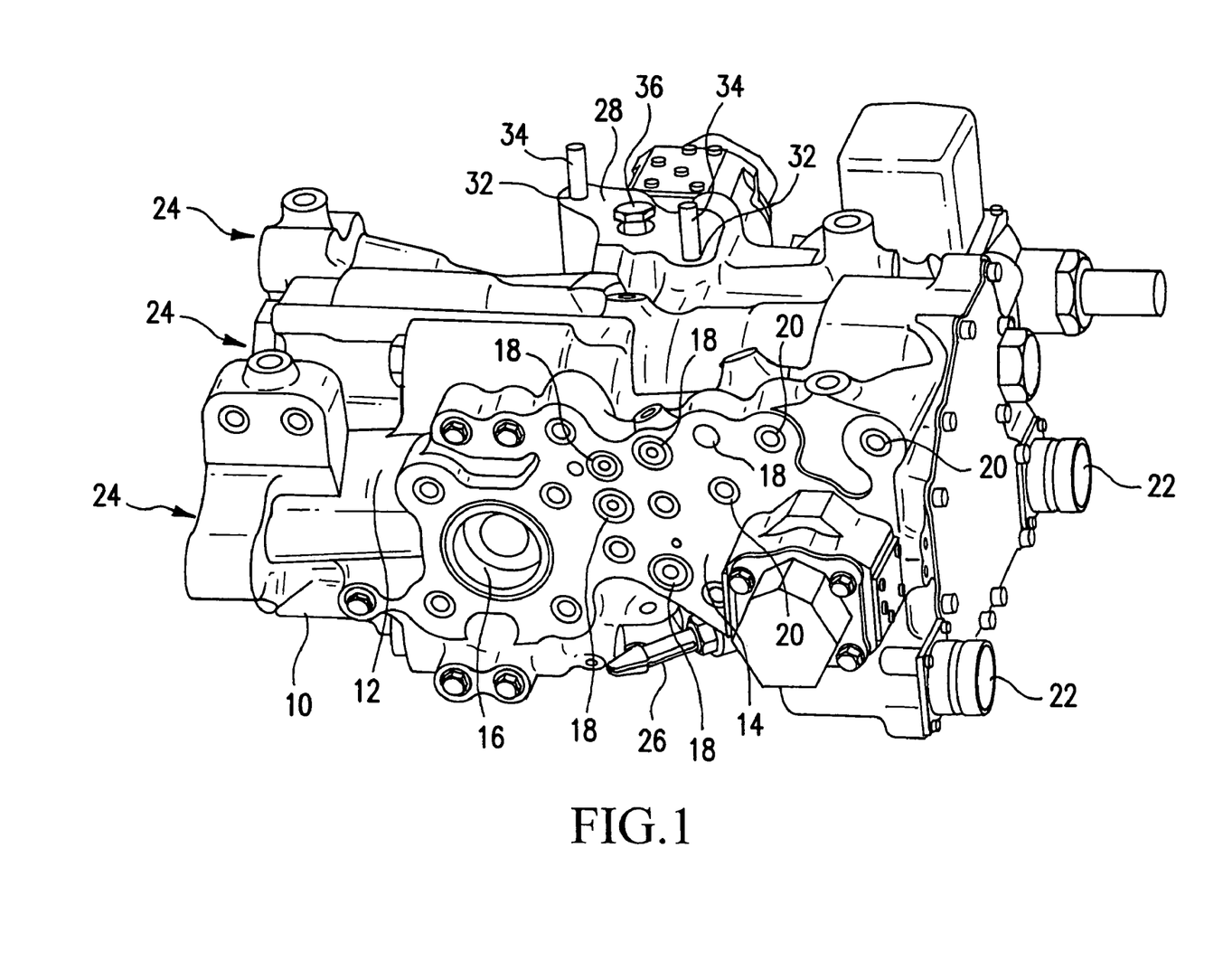
FIG. 1 is a side perspective view of a fuel distributor adapted to be mounted on an aircraft engine.
Figure 2:
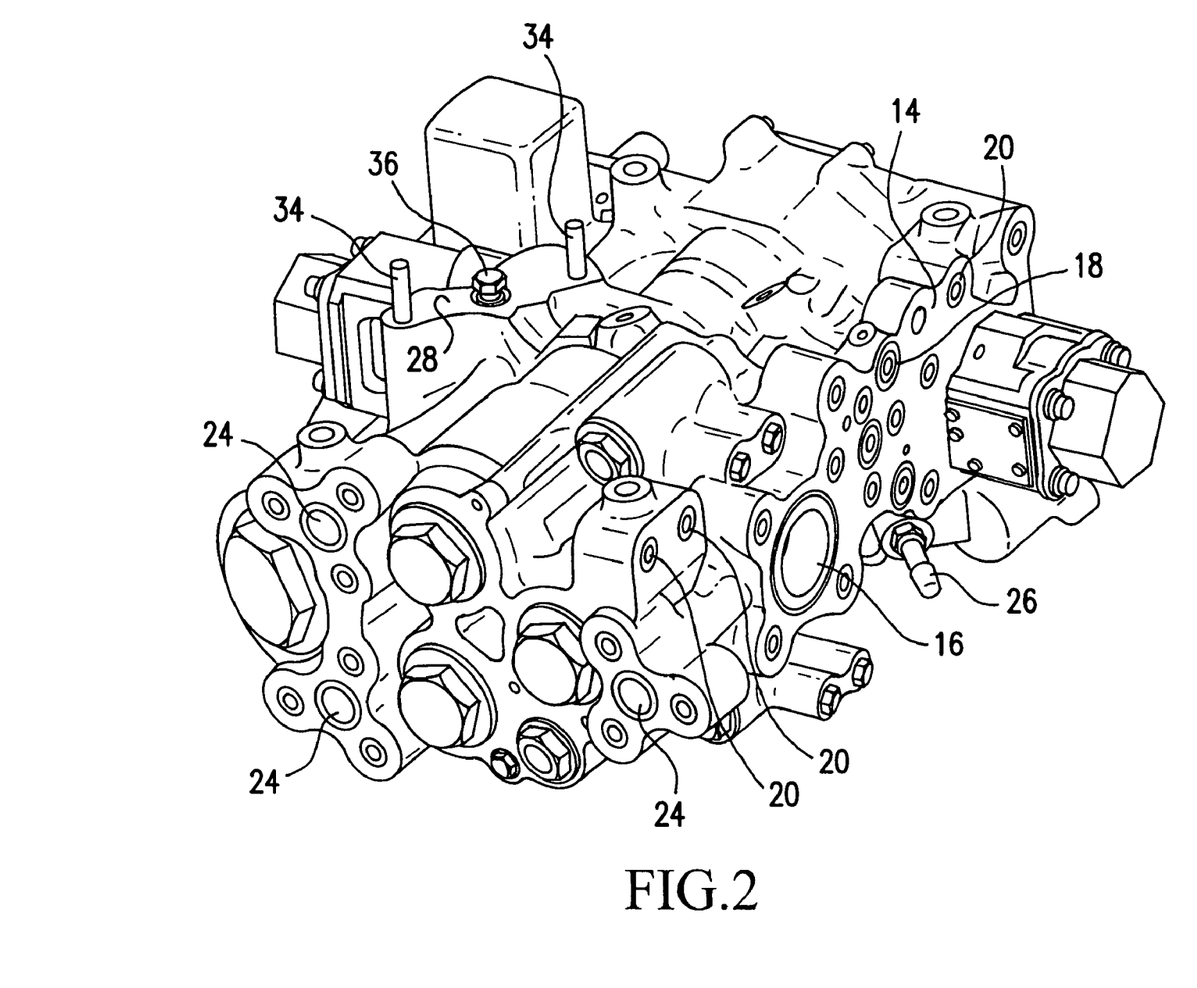
FIG. 2 is an end perspective view of the fuel distributor of FIG. 1.
Figure 11:
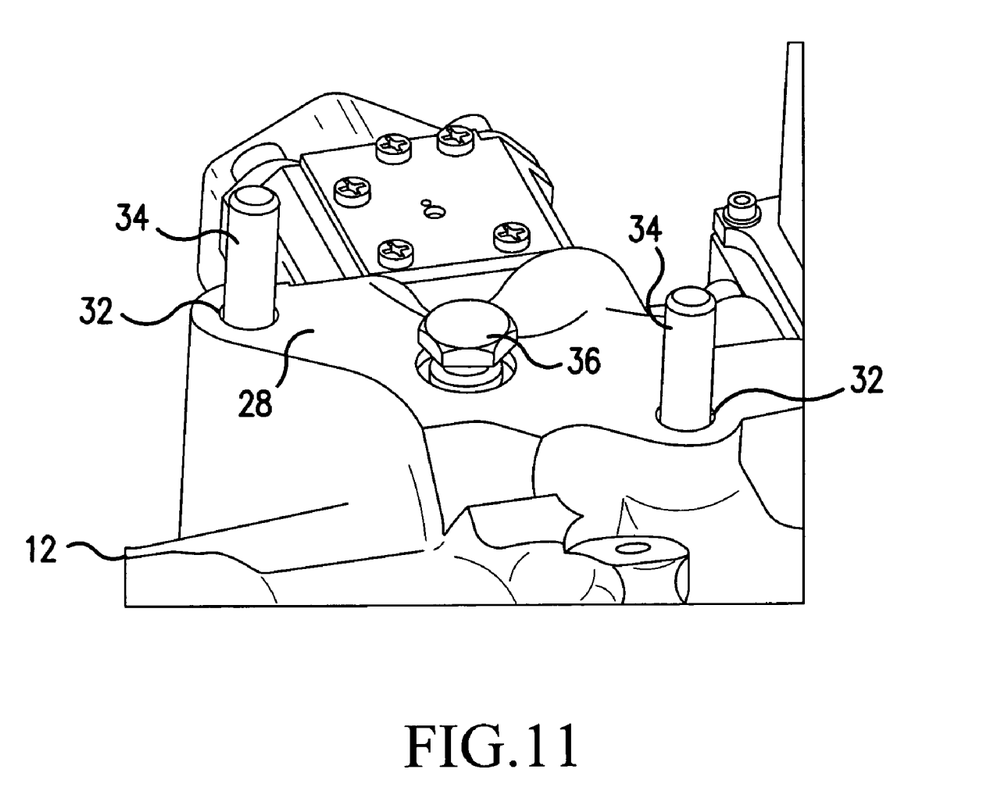
FIG. 11 is a detail view of a hanger block mounting surface on the fuel distributor of FIG. 1.

Referring now to the drawings, wherein the showings are for the purpose of illustrating a preferred embodiment of the invention only and not for the purpose of limiting same, FIG. 1 shows a fuel distributor 10 comprising a body 12 that houses various valves, controls and other functional elements that do not specifically comprise a part of the present invention. Body 12 includes a manifold mounting surface 14 that is smooth and planar and which includes, a main fuel port 16 and a plurality of auxiliary fluid ports 18 arranged in a first configuration, and a plurality of fastener receiving holes 20. Body 12 also includes first and second electrical connectors 22 for connecting fuel distributor 10 to a source of electrical power, a main fluid inlet opening 16, discharge ports 24, visible in FIG. 2, and a retention pin 26. A hanger block mounting surface 28, illustrated in FIGS. 1 and 11, is provided in a top side of body 12 and includes first and second fastener openings 32, through which project fasteners 34, and a cleat 36.

Figure 3:
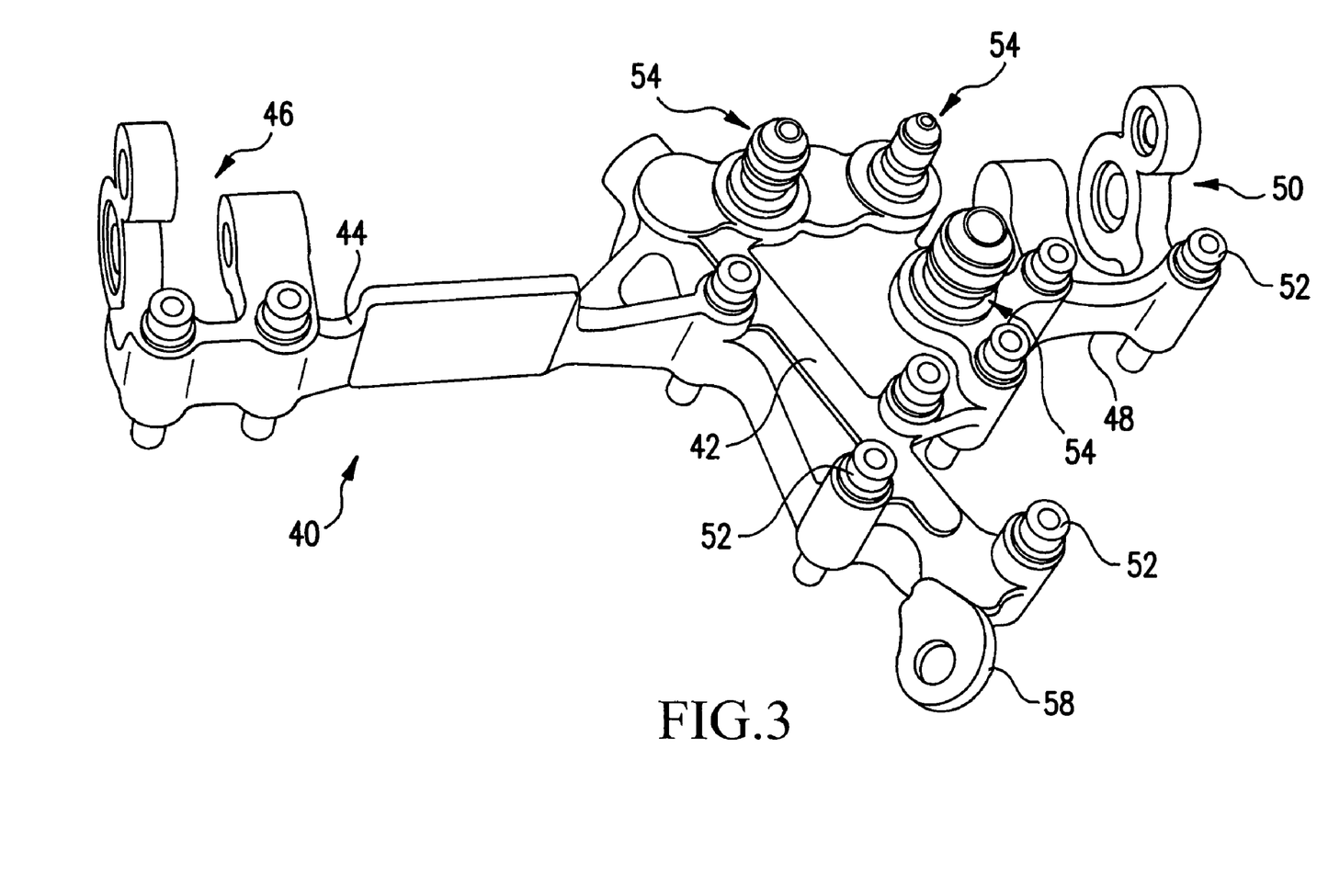
FIG. 3 is a front perspective view of an engine mountable manifold connectable to the fuel distributor of FIG. 1.
Figure 4:
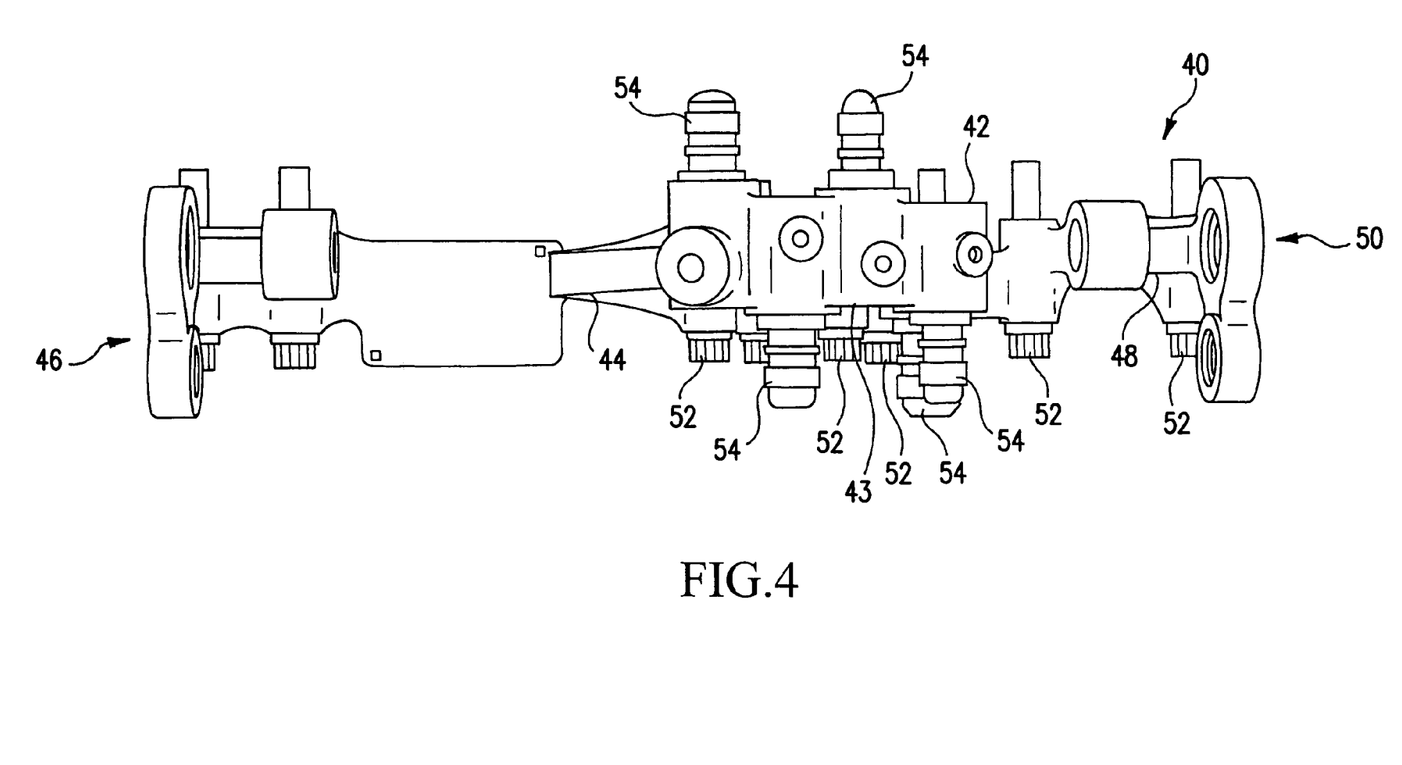
FIG. 4 is a top perspective view of the manifold of FIG. 3.
Figure 5:
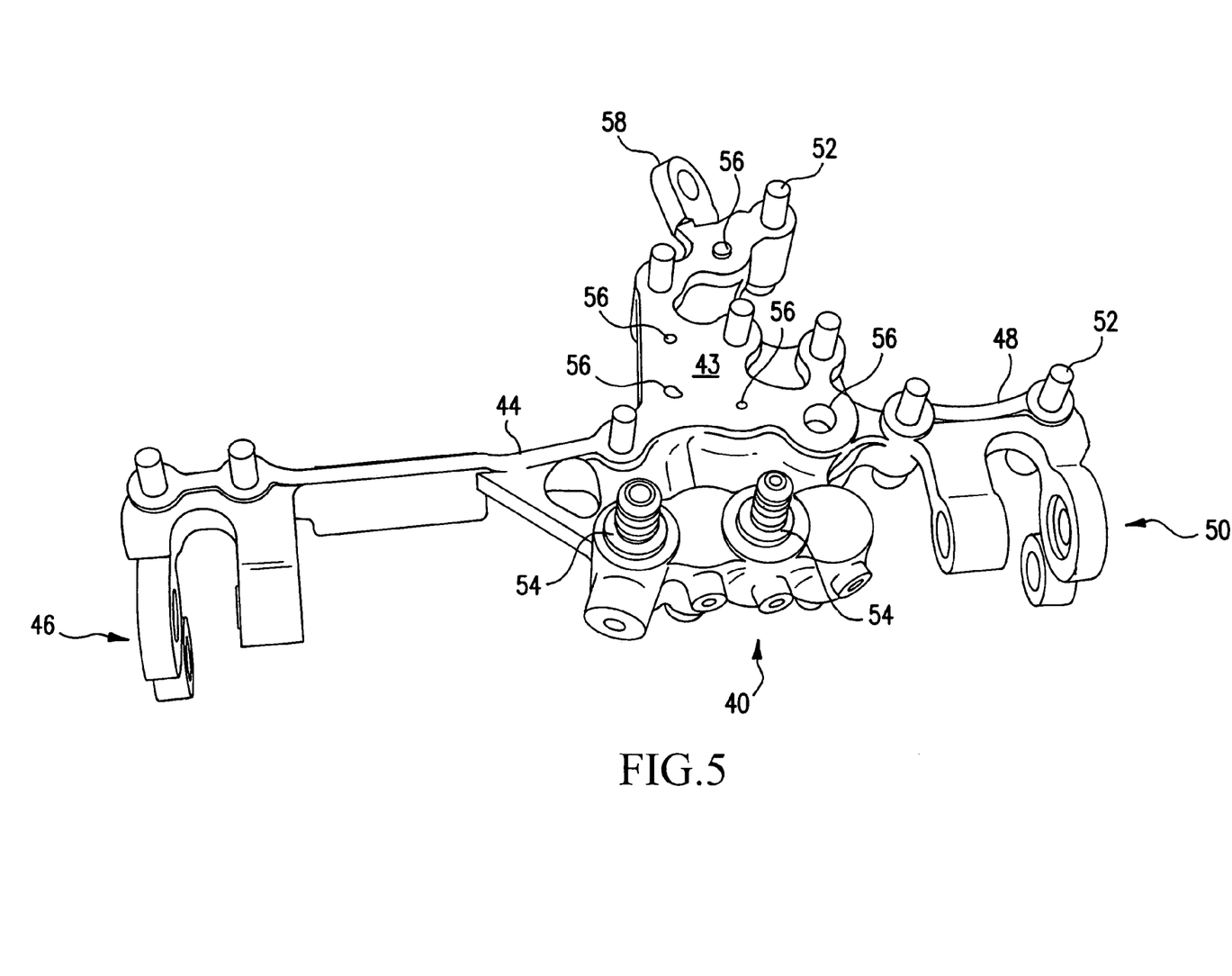
FIG. 5 is a rear perspective view of the manifold of FIG. 3.

FIG. 3 illustrates a manifold 40 according to an embodiment of the present invention which comprises a body portion 42 having a mounting surface 43 (FIGS. 4 and 5), a first arm 44 ending in a clevis 46, and a second arm 48 ending in a clevis 50. A plurality of fasteners, such as captive mounting bolts 52, project through the manifold. Manifold 40 further includes a plurality fluid fittings 54 arranged in the same configuration as the ports on body 12 for fluid connection to fluid outlets on an engine (not shown), a plurality of openings 56 on mounting surface 43 and a retention pin receiver 58.

Figure 6:
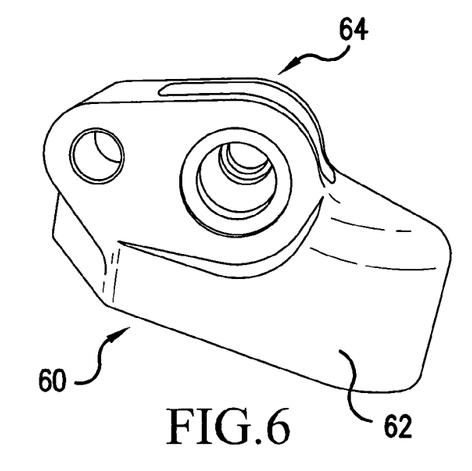
FIG. 6 is a side perspective view of a hanger block.
Figure 7:
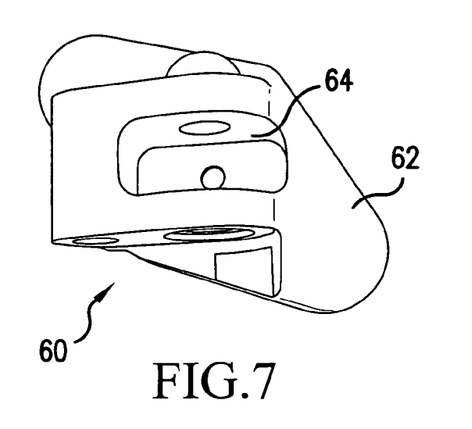
FIG. 7 is a top perspective view of the hanger block of FIG. 6.
Figure 8:
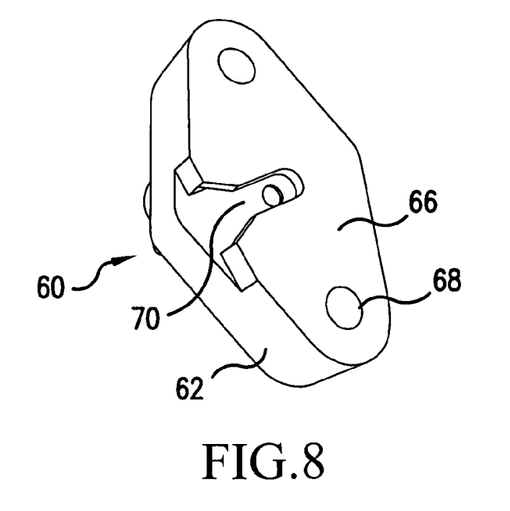
FIG. 8 is a bottom perspective view of the hanger block of FIG. 6.
Figure 9:
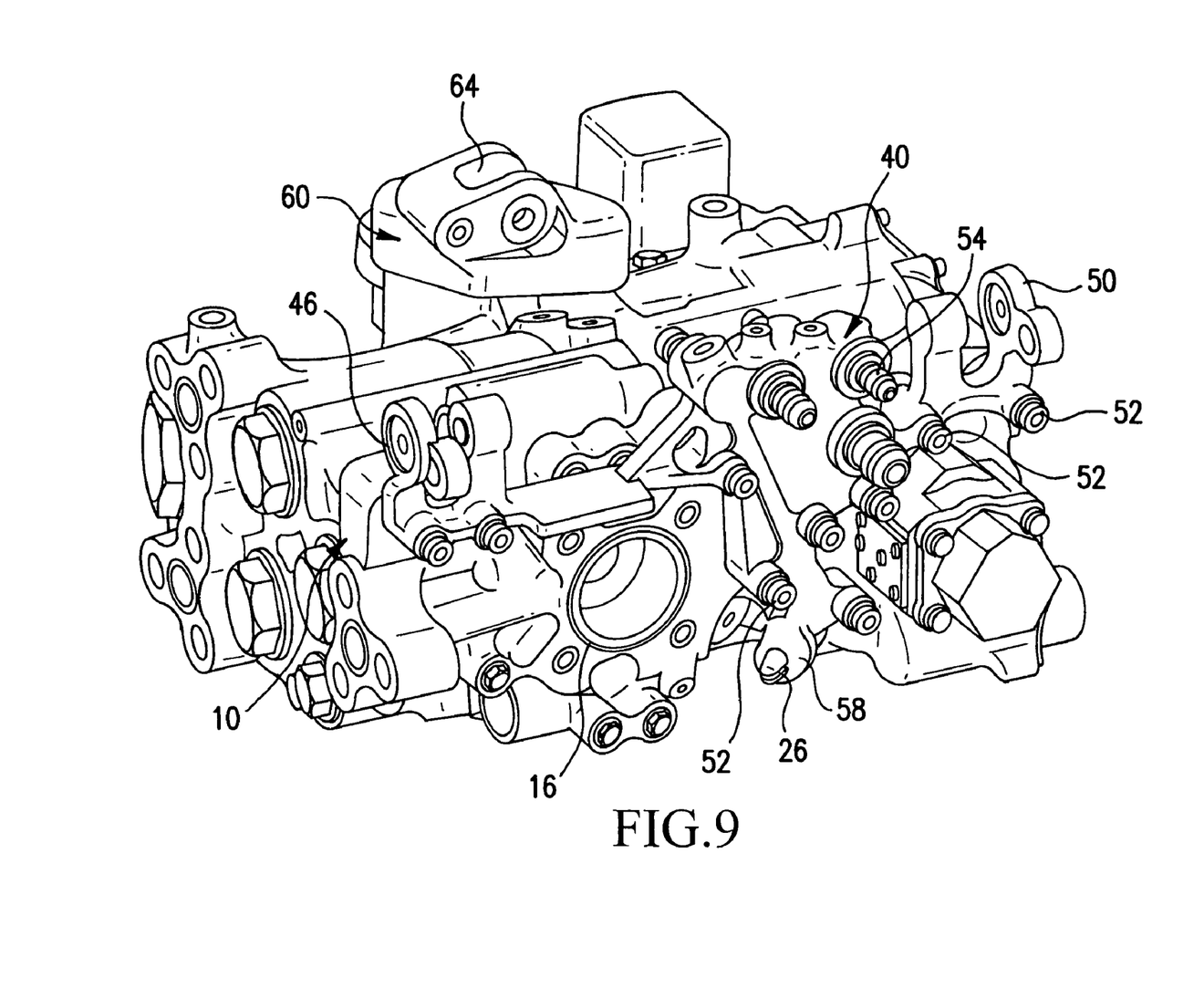
FIG. 9 is a side perspective view of the manifold of FIG. 3 and the hanger block of FIG. 6 connected to the fuel distributor of FIG. 1.

A hanger block 60 is illustrated in FIGS. 6-8 and includes a body portion 62, a clevis 64, and a bottom surface 66 that includes first and second openings 68 for receiving fasteners, such as fasteners 34, and a slot 70 for slidably receiving the head of mounting cleat 36.

Figure 10:
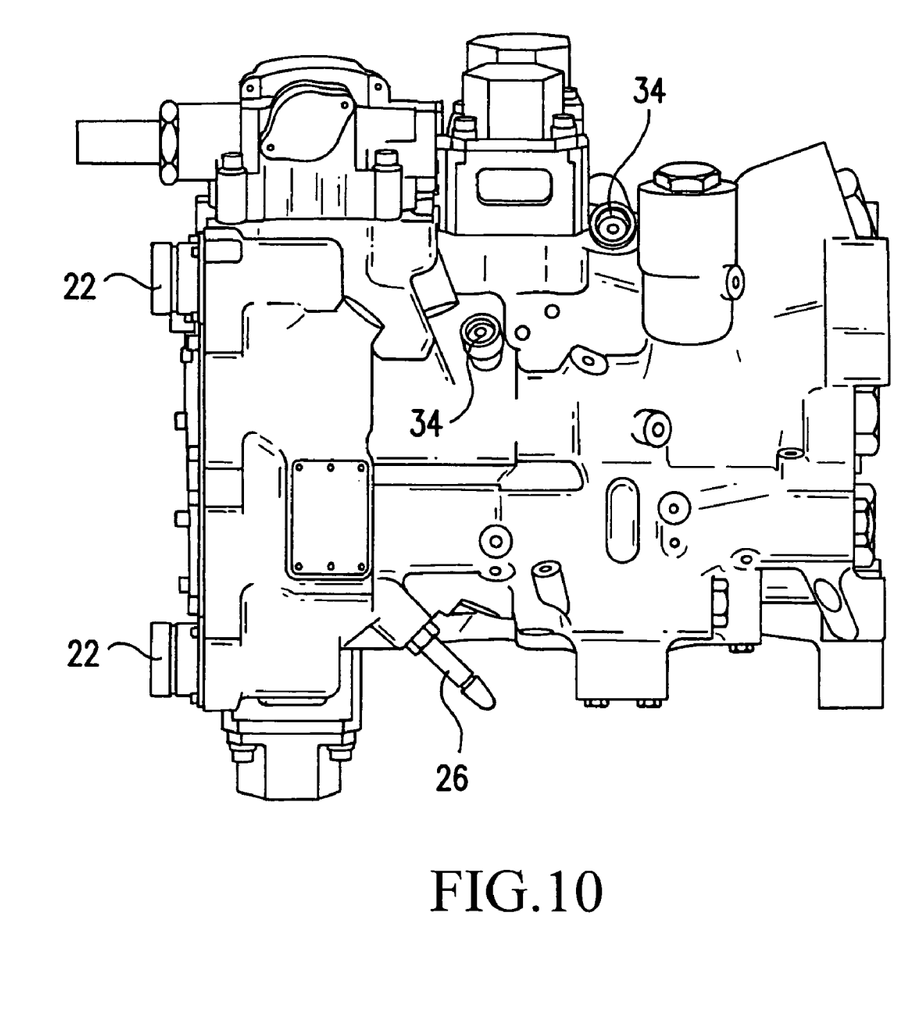
FIG. 10 is a bottom plan view of the fuel distributor of FIG. 9.
Figure 12:
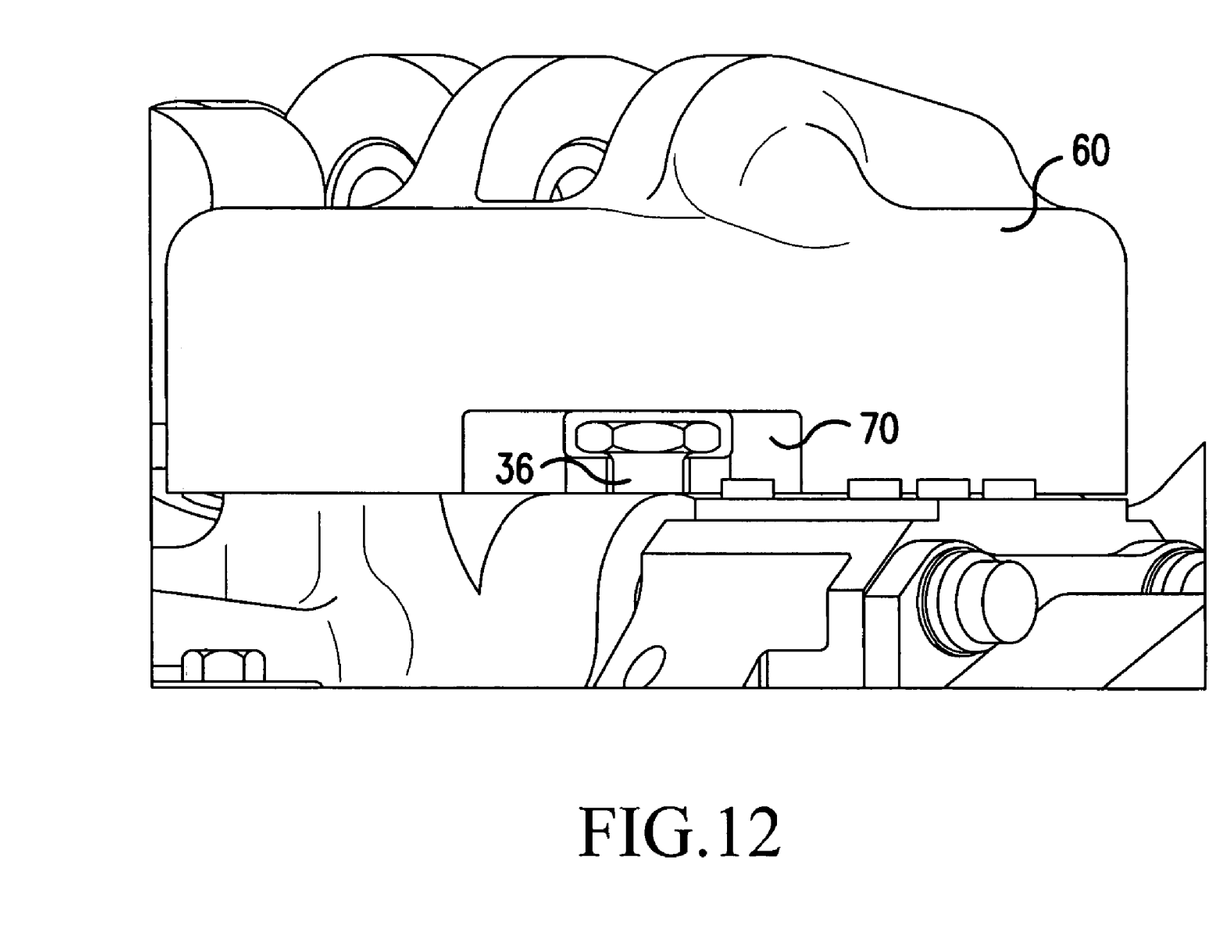
FIG. 12 is a detail view illustrating a hanger cleat of the fuel distributor of FIG. 1 received within the hanger block of FIG. 6.
Figure 16:
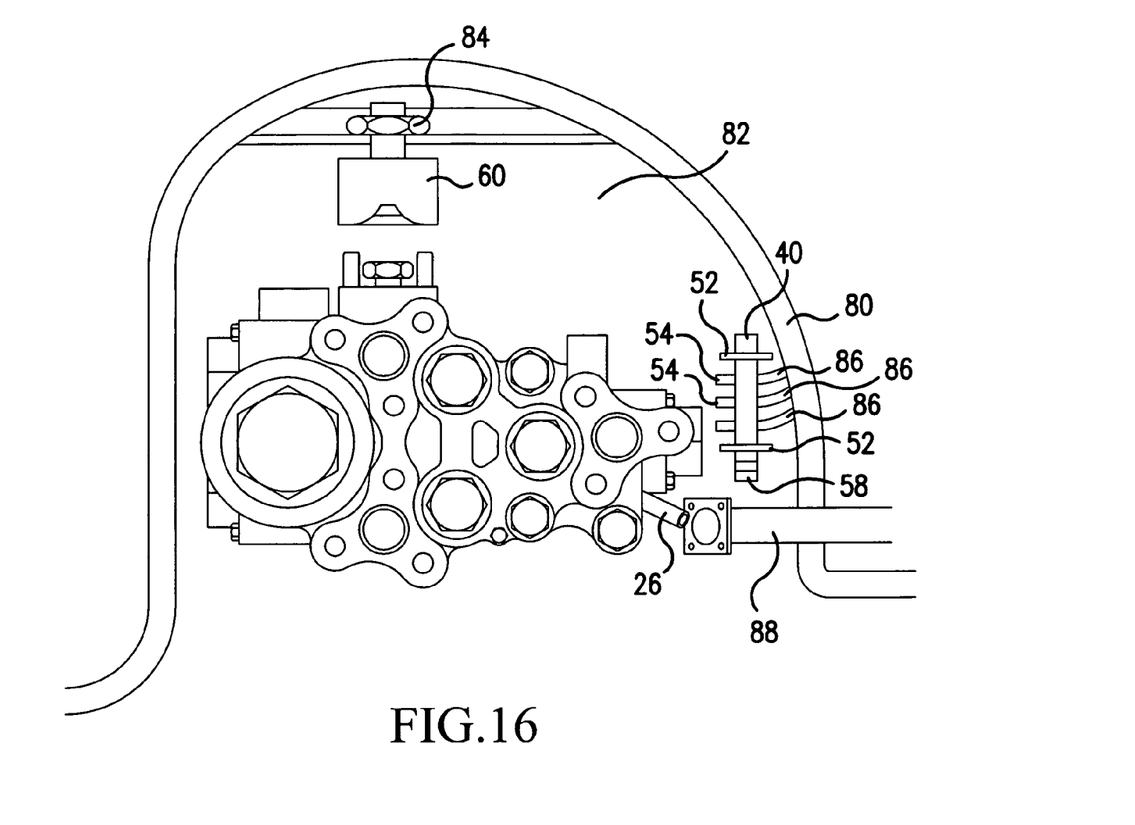
FIG. 16 is a schematic side elevational view of the hanger block of FIG. 6 and the manifold of FIG. 3 connected to an aircraft engine and the fuel distributor of FIG. 1 just before being hung from the hanger block.

With reference to FIG. 16, in use hanger block 60 is mounted to the underside of an aircraft engine 80 in a recess 82 using clevis 64 and a pin 84 to secure hanger block 60 in a predetermined location. Manifold 40 is connected to the engine 80 using clevis 46 and clevis 50 and suitable pins with fluid fittings 54 connected to engine fluid lines 86 the engine. This use of devises and clevis pins for mounting helps accommodate differential thermal expansion of the engine, manifold and fuel distributor. With hanger block 60 and manifold 40 properly mounted on the engine, fuel distributor 10 is raised toward the engine until mounting cleat 36 is received in slot 70, as illustrated in FIG. 12. At this point, mounting cleat 36 is supporting a large portion of the weight of fuel distributor 10. Retention pin 26 on fuel distributor 10 is inserted into retention pin receiver 58 on manifold 40, and fasteners 34 are inserted through openings 32 that reach hanger block mounting surface 28 from the opposite side of body 12 (see FIG. 10) and into fastener receiving openings 68 on the bottom 66 of hanger block 60. Secured in this manner, a worker can insert fasteners 52 into openings 20 on manifold mounting surface 14 to secure the fuel distributor 10 to the engine while the weight of the fuel distributor 10 is supported by the hanger block 60 and retention pin 26. In a separate step, a worker can connect a main fuel line 88 to the main fuel port 16 on the fuel distributor 10.

One particular fuel distributor, which requires installation from below an aircraft engine, generally required two workers to install. The tolerances between the fuel distributor and the mounts on the engine are very small, and thus it often required two worker to align the fuel distributor and then hold it in place while necessary connections were made. Using the arrangement of an embodiment of the present invention, however, relatively lightweight hanger block 60 can be positioned very precisely and attached to an engine by a single worker. The same worker can then attach a relatively lightweight manifold 40 to the necessary fuel lines and carefully position manifold 40 between the two supports (not shown) that will engage devises 46 and 50. With the hanger block and manifold in place, hanging cleat 36 is inserted into slot 70 which has a relatively large tolerance. With the fuel distributor 10 supported by hanging block 60, the final, close tolerance connections between the bolts 34 and the hanging block 60 and between captive bolts 52 and the mounting holes 20 can be made relatively easily because cleat 36 and hanging block 60 are supporting substantially all the weight of the fuel distributor 10.

It should by noted that the flat mounting surface 43 of manifold 40 and the flat manifold mounting surface 14 of fuel distributor 10 are adapted to slide past one another and that these surfaces can remain parallel to one another when the fuel distributor 10 is installed—minimal or no relative movement normal to the planes of the mounting surfaces is needed, and this allows fuel distributor 10 to be mounted with relatively little clearance. When mounted in this manner, most fluid connections, those between openings 43 in manifold 40 and openings 18 in fuel distributor 10 are made merely by attaching the fuel distributor to the manifold. Other fluid connections, such as connections of a pipe to main flow inlet 16 and to main flow discharges 24 are accomplished separately. In this manner, the weight of the fuel distributor is reduced from that of a fuel distributor with a full manifold. And, because the manifold is not needed to accommodate the high volumes and pressures flowing into main inlet 16 (separate piping is used) the combined weight of the manifold and the fuel distributor together is less than the weight of a fuel distributor having a full manifold which includes a connection to a main fuel inlet.

Figure 13:
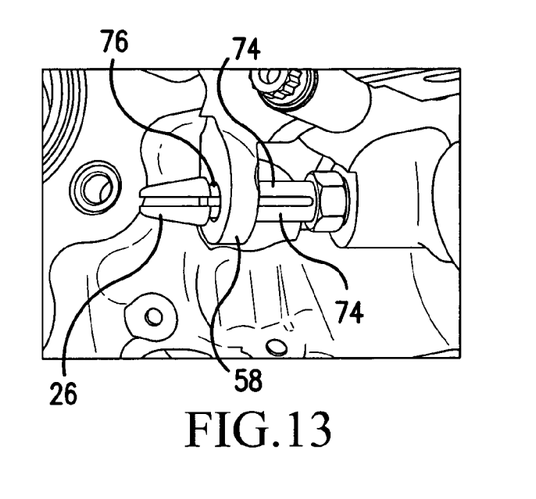
FIG. 13 is a perspective view of a first configuration for a hanger pin according to an aspect of the present invention.

FIG. 13 shows in detail retention pin 26 received in retention pin receiver 58. As will be appreciated from this figure, retention pin 26 is split into two pin halves 74 and includes an enlarged, tapered head 76. When tapered head 76 is pressed against the opening in retention pin receiver 58, the pin halves 74 are forced toward one another until head 76 passes through the opening at which time the pin halves move apart and prevent the retention pin 26 from being removed from the opening unless the pin halves are once again forced together.

Figure 14:
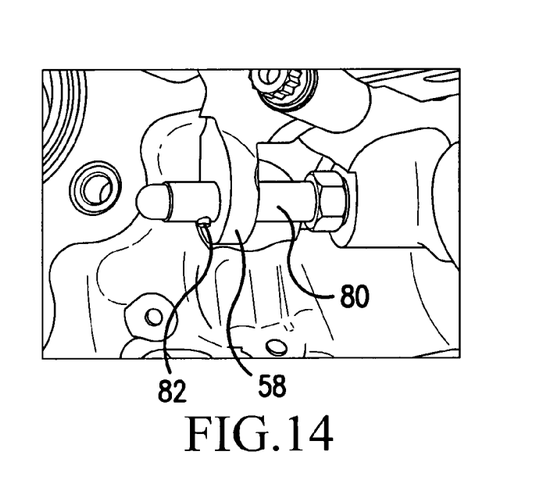
FIG. 14 is a perspective view of a second configuration for a hanger pin according to an aspect of the present invention.

FIG. 14 illustrates an alternate retention pin 80 that includes a projecting spring-biased button 82. To insert pin 80 through the opening in retention pin receiver 58, the button is pressed into pin 80. Once button 82 passes through the opening in retention pin receiver 58 it is released to prevent the retention pin 80 from being removed from retention pin receiver 58. Button 82 may optionally include an angled cam surface so that it will be compressed when button 82 moves in a first direction through the opening in retention pin receiver 58 while still preventing the pin from being removed.

Figure 15:
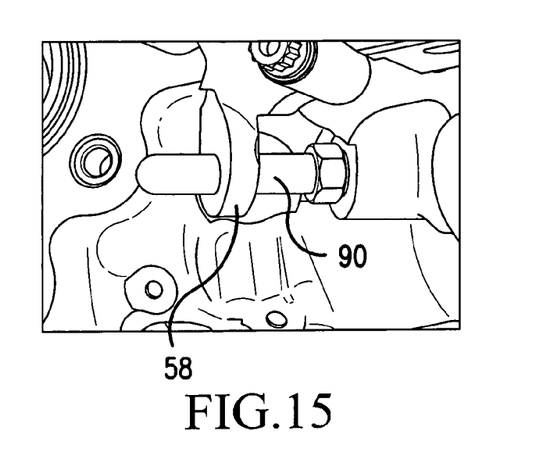
FIG. 15 is a perspective view of a third configuration for a hanger pin according to an aspect of the present invention.

FIG. 15 illustrates another alternate retention pin 90 which has a solid pin body and can be freely inserted into and removed from the opening in retention pin receiver 58.

The invention has been described herein in terms of several embodiments. However, obvious modifications and additions to these embodiments will become apparent to those skilled in the relevant arts upon a reading of the foregoing description. It is intended that all such obvious modifications and additions form a part of the present invention to the extent that they fall within the scope of the several claims appended hereto.

We claim:

1. A method of connecting a fuel distributor having a main fuel inlet port, multiple additional fluid ports, and a hanging cleat to an engine, the method comprising the steps of:
   - connecting a plurality of fluid lines on the engine to a manifold;
   - providing a hanger including a hanger body, a clevis on the hanger body, and a slot formed in the hanger body substantially opposite the clevis;
   - inserting a pin into the clevis to attach the hanger to a mounting structure provided within the engine;
   - hanging the fuel distributor from the internal support structure by sliding the head of the hanging cleat into the slot;
   - connecting the manifold to the fuel distributor; and
   - connecting a main fuel input line separate from the manifold to the fuel distributor.

2. The method of claim 1 including the additional step of securing the fuel distributor to the hanger with a fastener in addition to the hanging cleat.

3. The method of claim 1 including the additional step of securing the fuel distributor to the engine with a fastener in addition to the hanging cleat.

4. The method of claim 1 including the additional step of providing a plurality of captive bolts on the manifold and wherein said step of connecting the manifold to the fuel distributor comprises the step of inserting the captive bolts into openings on the fuel distributor.

5. The method of claim 1 wherein the fuel distributor includes a mounting pin, the manifold includes a mounting pin receiving opening and wherein said step of connecting the manifold to the fuel distributor comprises the step of inserting the mounting pin in the mounting pin receiving opening.

6. The method of claim 5 including the additional step of providing a plurality of captive bolts on the manifold and wherein said step of connecting the manifold to the fuel distributor comprises the step of inserting the captive bolts into openings on the fuel distributor.

7. The method of claim 1 wherein the fuel distributor includes a first surface from which the hanging cleat projects, a second surface opposite the first surface and a third surface between the first and second surfaces containing the multiple additional fluid ports, wherein said step of hanging the fuel distributor from the hanger comprises the step of moving the fuel distributor from a first position with the first surface and third surface on a first side of the manifold to a second position with the first surface on a second side of the manifold and the second surface on the first side of the manifold.

8. The method of claim 1 wherein the engine includes a recess, the hanger is mounted in the recess, and said step of hanging the fuel distributor from the hanger comprises the step of at least partially inserting the fuel distributor into the recess.

9. A fuel distributor and mounting arrangement configured to be installed within a gas turbine engine (GTE), the fuel distributor and mounting arrangement comprising:
   - a fuel distributor, comprising:
     - a fuel distributor body;
     - a hanger block mounting surface formed in an upper portion of the fuel distributor body; and
     - a hanging cleat projecting from the hanger block mounting surface; and
   - a hanger block, comprising:
     - a hanger block body;
     - a clevis provided on an upper portion of the hanger block body, the clevis configured to be attached to a mounting structure provided within the GTE; and
     - a slot formed in a lower portion of the hanger block body substantially opposite the clevis, the slot adapted to slidably receive the head of the hanging cleat to permit the fuel distributor to be hung from the hanger block and, therefore, from the mounting structure provided within the GTE.

10. The fuel distributor and mounting arrangement of claim 9 wherein said hanging cleat is configured to suspend the fuel distributor below the mounting structure provided within the GTE.

11. The fuel distributor and mounting arrangement of claim 9 wherein the fuel distributor further comprises a first fastener opening therethrough, and wherein the hanger block further comprises a second fastener opening formed in a lower portion of the hanger block body, the second fastener opening generally aligning with the first fastener opening when the fuel distributor is hung from the hanger block.

12. The fuel distributor and mounting arrangement of claim 9 wherein the fuel distributor further comprises:
   - a manifold mounting surface formed in a side portion of the fuel distributor body; and
   - a main fuel port and a plurality of auxiliary ports formed through the manifold mounting surface.

13. The fuel distributor and mounting arrangement of claim 12 further comprising a manifold, comprising:
   - a manifold body configured to be mounted to the manifold mounting surface without covering the main fuel port; and
   - a plurality of ports formed through the manifold body and configured to generally align with the plurality of auxiliary ports formed through the manifold mounting surface when the manifold body is mounted thereto.

14. The fuel distributor and mounting arrangement of claim 13 wherein the fuel distributor further comprises a mounting pin extending from the fuel distributor body proximate the manifold mounting surface, and wherein the manifold further comprises a mounting pin receiver fixedly coupled to the manifold body and configured to receive the mounting pin to secure the manifold to the fuel distributor.

15. The fuel distributor and mounting arrangement of claim 13 wherein the manifold further comprises:
   - a first arm extending away from the manifold body and ending in a first manifold clevis; and
   - a second arm extending away from the manifold body in a direction substantially opposite the firm arm and ending in a second manifold clevis.

16. A hanger block for mounting a fuel distributor within a gas turbine engine (GTE) for use in conjunction with a pin, the fuel distributor including a hanger block mounting surface and a hanging cleat projecting therefrom, the hanger block comprising:
   - a hanger block body;
   - a clevis provided on an upper portion of the hanger block body and adapted to receive the pin therethrough to permit the hanger block to be hung from a mounting structure provided within the GTE; and
   - a slot formed in a lower portion of the hanger block body substantially opposite the clevis, the slot adapted to slidably receive the head of the hanging cleat therein to permit the fuel distributor to be hung from the hanger block and, therefore, from the mounting structure provided within the GTE.

* * * * *

UNITED STATES PATENT AND TRADEMARK OFFICE
CERTIFICATE OF CORRECTION

PATENT NO. : 7,516,736 B2 Page 1 of 1
APPLICATION NO. : 11/432523
DATED : April 14, 2009
INVENTOR(S) : Steven A. Lewis et al.

It is certified that error appears in the above-identified patent and that said Letters Patent is hereby corrected as shown below:

Column 6, line 46, "firm" should be changed to --first--.

Signed and Sealed this

Ninth Day of June, 2009

JOHN DOLL
*Acting Director of the United States Patent and Trademark Office*